(12) United States Patent
Scelza

(10) Patent No.: US 7,458,316 B2
(45) Date of Patent: Dec. 2, 2008

(54) APPARATUS FOR BREWING BEVERAGES SUCH AS COFFEE AND THE LIKE

(76) Inventor: Joseph Scelza, P.O. Box 476, 141 W. Main St., Canaan, CT (US) 06018-0476

( * ) Notice: Subject to any disclaimer, the term of this patent is extended or adjusted under 35 U.S.C. 154(b) by 232 days.

(21) Appl. No.: 11/390,547

(22) Filed: Mar. 24, 2006

(65) Prior Publication Data

US 2007/0221067 A1    Sep. 27, 2007

(51) Int. Cl.
*A47J 31/00* (2006.01)
*F27D 11/00* (2006.01)

(52) U.S. Cl. .............................. 99/307; 99/279; 99/295; 99/292; 99/303; 99/284; 219/202; 219/436; 219/437; 392/444; 126/609; 126/610

(58) Field of Classification Search ................. 99/307, 99/295, 292, 303, 284, 304, 279, 290; 219/432, 219/202, 436–7, 443; 392/444; 126/609–610
See application file for complete search history.

(56) References Cited

U.S. PATENT DOCUMENTS

| | | | |
|---|---|---|---|
| 3,650,201 A * | 3/1972 | Jovanovic | ..................... 99/279 |
| 3,915,079 A | 10/1975 | Balderson | |
| 3,955,713 A | 5/1976 | Hurley | |
| 4,151,790 A | 5/1979 | Spirk | |
| 4,382,402 A | 5/1983 | Alvarez | |
| 4,512,246 A * | 4/1985 | Chappell et al. | .............. 99/312 |
| 4,674,400 A | 6/1987 | Rondel et al. | |
| 4,875,408 A | 10/1989 | McGee | |
| 5,049,713 A | 9/1991 | Creyaufmuller | |
| 5,123,335 A | 6/1992 | Aselu | |
| 5,233,914 A | 8/1993 | English | |
| 5,274,736 A | 12/1993 | Rohr, Jr. | |
| 5,377,581 A | 1/1995 | Campbell | |
| 5,434,392 A | 7/1995 | Belinkoff | |
| 5,902,620 A | 5/1999 | Nolan | |
| 6,037,570 A | 3/2000 | Noles | |
| 6,123,010 A | 9/2000 | Blackstone | |

* cited by examiner

*Primary Examiner*—Shawntina Fuqua
(74) *Attorney, Agent, or Firm*—Abelman, Frayne & Schwab

(57) ABSTRACT

An apparatus is disclosed for brewing coffee, which includes a housing having an inner chamber for receiving and retaining brewed coffee, a water reservoir adjacent to and generally surrounding the inner chamber, for receiving water, and an electrically powered coil for heating the water contained in the water reservoir. A brew valve is positioned above the inner chamber for supporting coffee grounds, the brew valve being rotatable between a first inactive position and a second active position for brewing coffee. Heated water is directed from the water reservoir to the brew valve and to the coffee grounds to brew coffee. and to the coffee grounds to produce brewed coffee, and into the inner chamber.

26 Claims, 10 Drawing Sheets

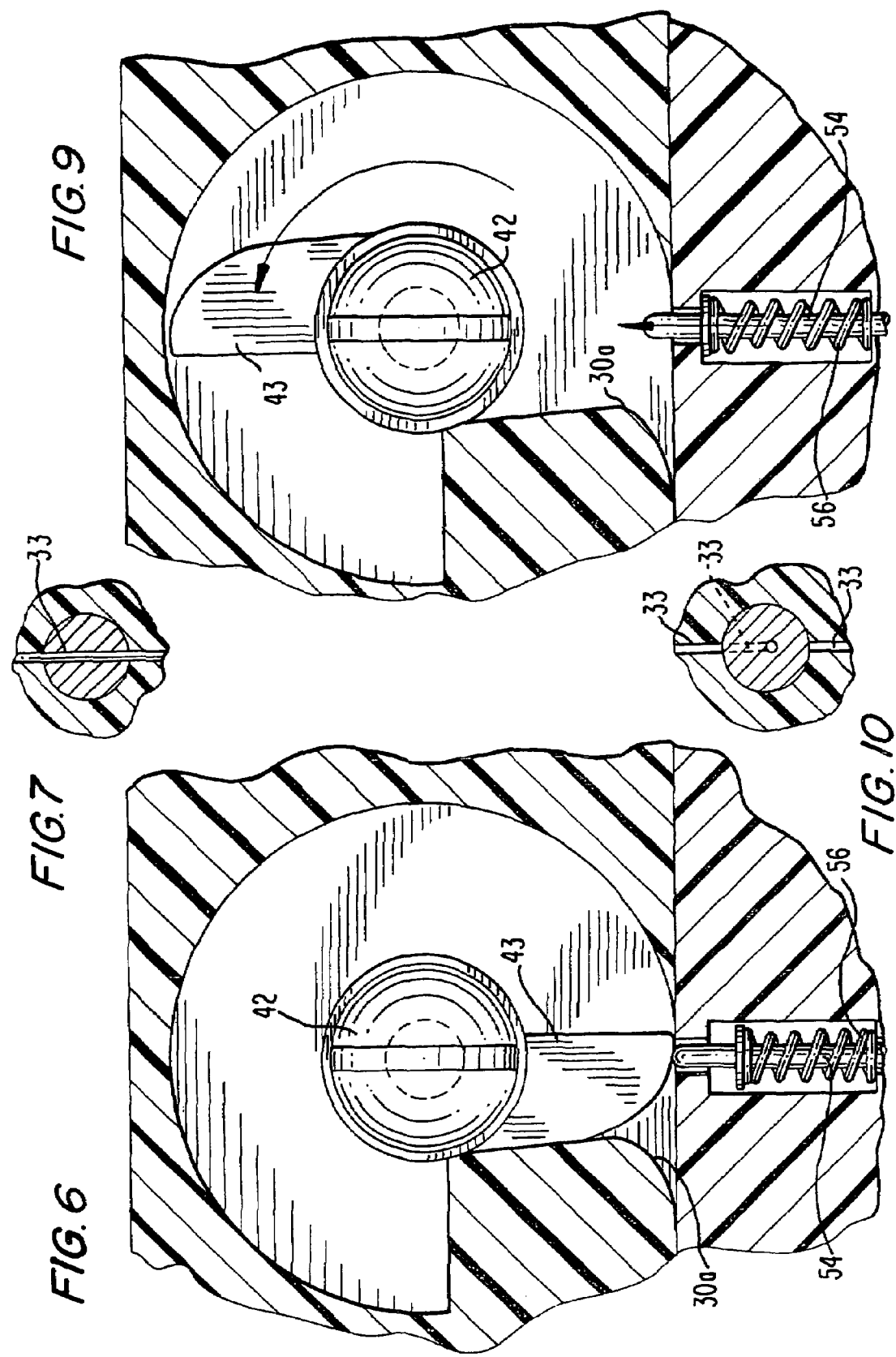

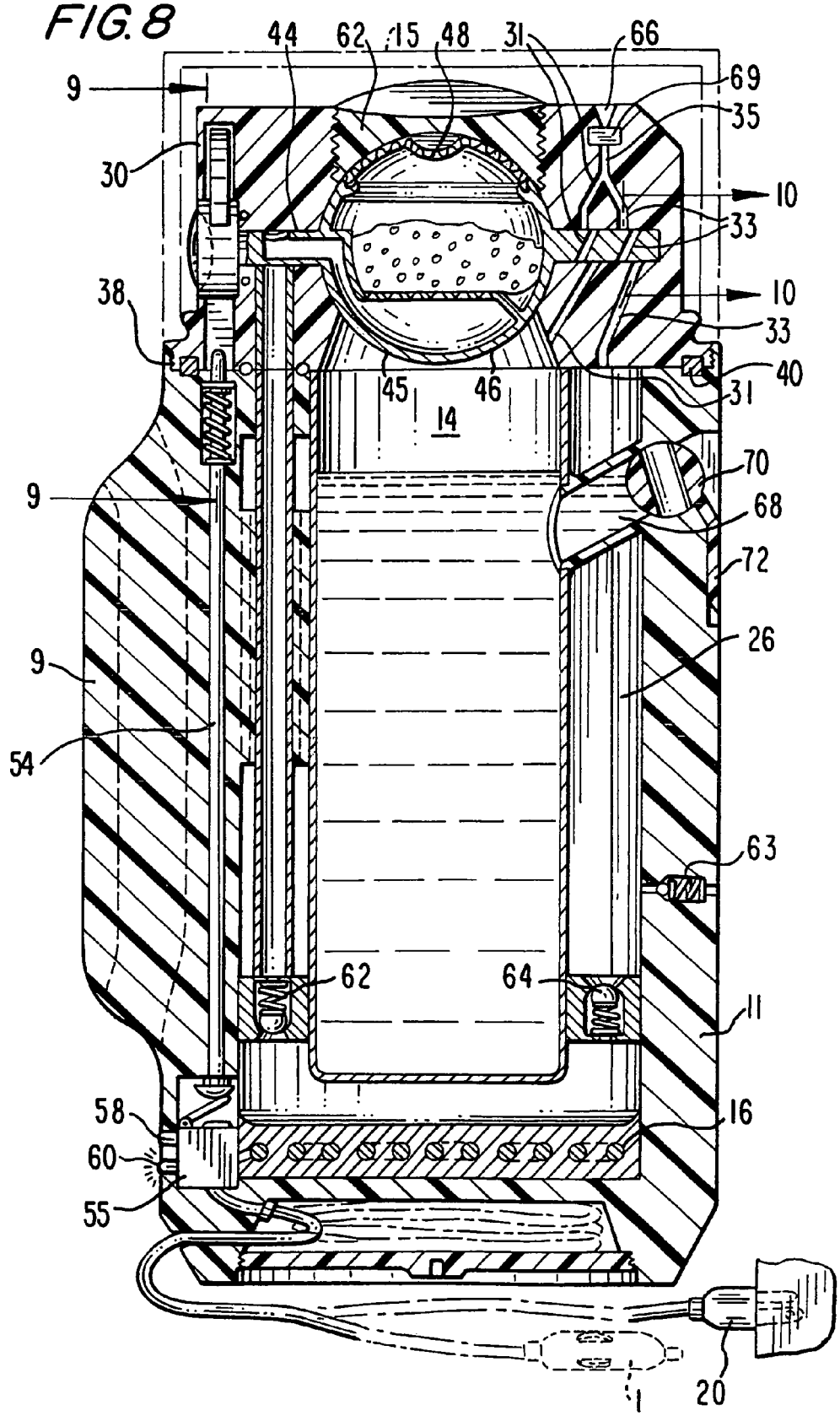

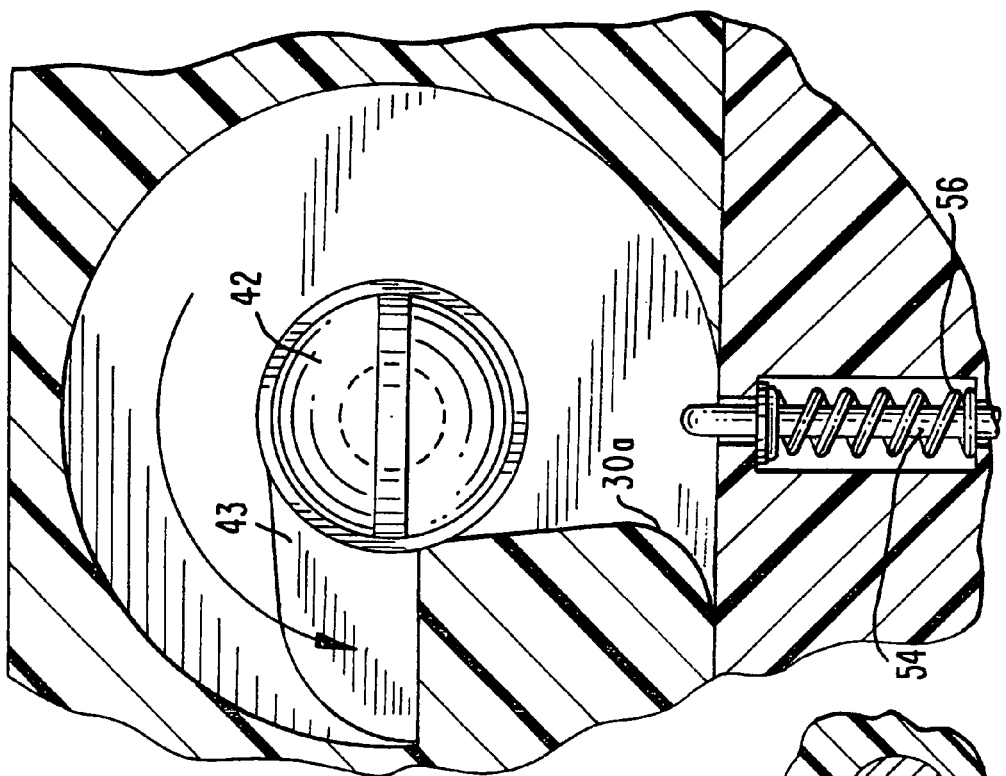
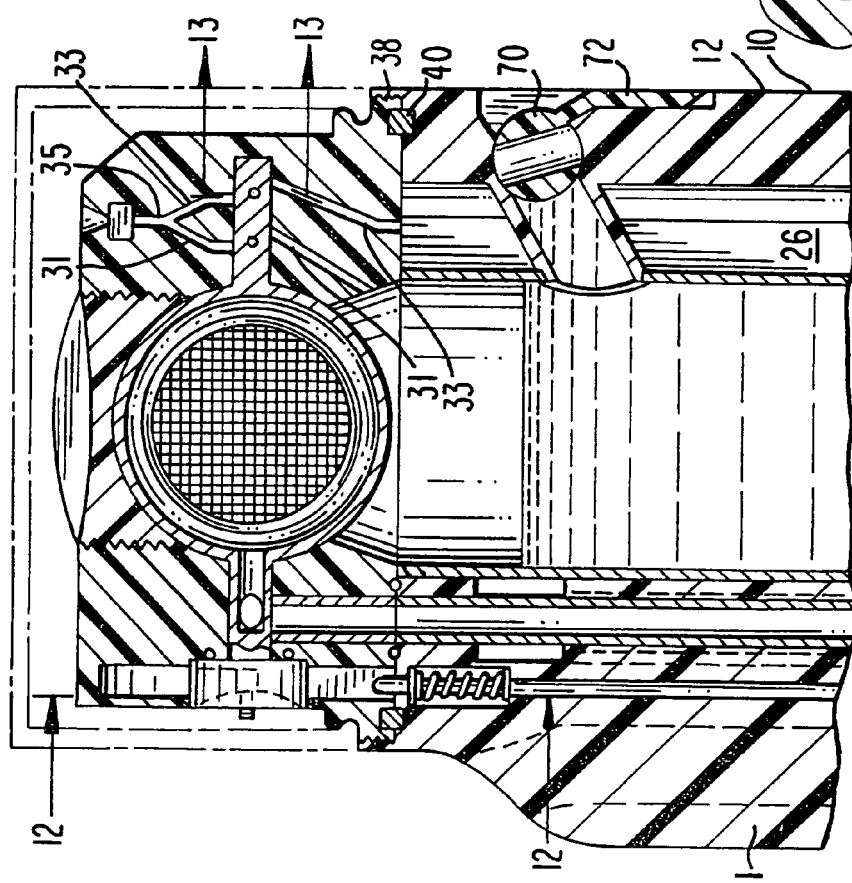
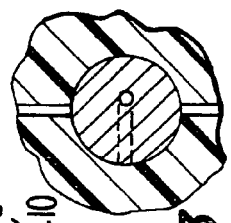
FIG.12
FIG.11
FIG.13

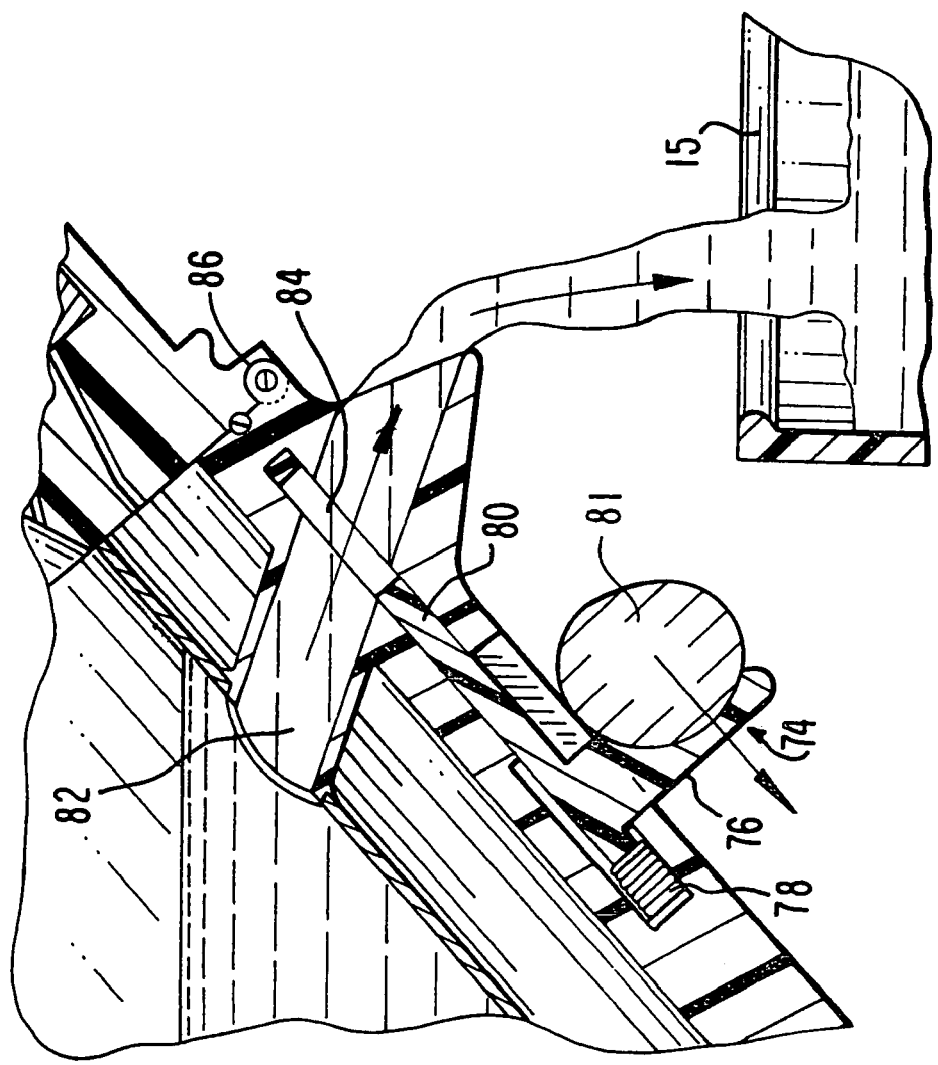
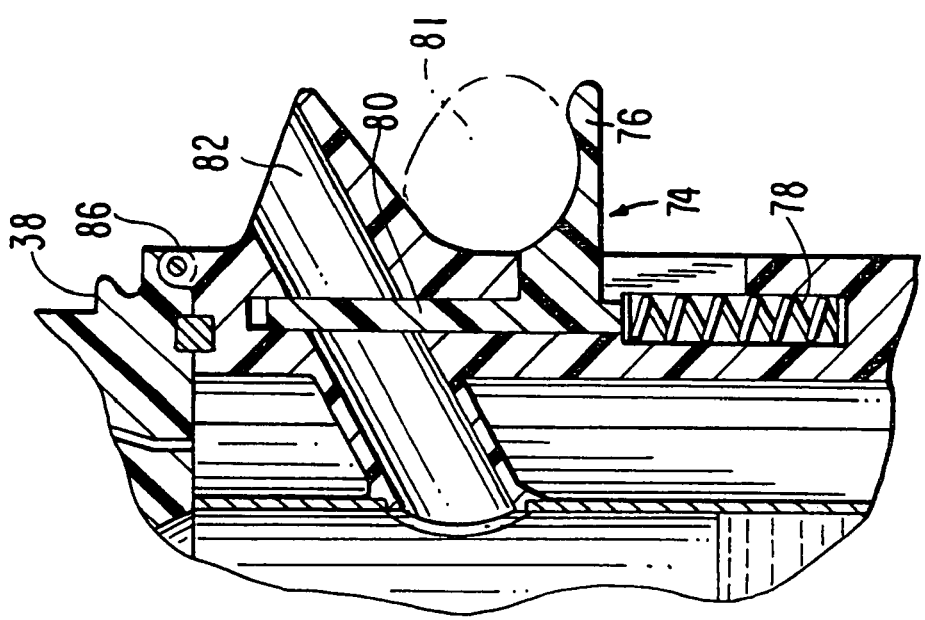

APPARATUS FOR BREWING BEVERAGES SUCH AS COFFEE AND THE LIKE

BACKGROUND OF THE INVENTION

1. Field of the Invention

The present invention relates to an apparatus for brewing beverages, including coffee, tea and the like. In particular, the apparatus is portable and is capable of rapidly brewing the beverage utilizing either conventional electrical power of motor vehicle electrical power.

2. Description of the Related Art

Electrically powered devices for brewing coffee are generally available in various forms, including the household type, which operates on household 110 volt alternating current and is capable of brewing any number of a plurality of cups of the beverage. On the other hand, household devices are also available for brewing a single cup of the beverage. In addition, portable devices are generally available for brewing coffee on a limited basis when travelling, or even brewing the coffee in a motor vehicle.

U.S. Pat. No. 3,955,713 relates to a coffee making console for automobiles from which hot drinks of coffee or the like may be dispensed. The console may be installed typically on the floor of an automobile on the passenger side of the transmission hump. The console includes a plurality of storage compartments adapted to contain materials such as water, sugar, instant coffee, powdered cream or the like, with each compartment being provided with a valve for dispensing the contents of the chamber onto a common trough feeding into a filling station located below the trough. A detachable tank for water storage is provided for replenishing the water chamber which is provided with a heating element. The element may be energized by connecting a cord to the car's electrical system as to the cigarette lighter.

U.S. Pat. No. 4,151,790 relates to a coffee maker for vehicles which includes a reservoir and heating chamber, having a vent tube, connected to the reservoir for receiving water there from, a heater for the heating chamber, and the coffee making area connected to the heating chamber.

U.S. Pat. No. 4,382,402 relates to a portable coffee maker adapted to be used with a package of ground coffee and a package of water. The coffee maker includes a water heating chamber and a coffee brewing chamber. Within the water heating chamber is a device to pierce the package of water and a percolator to heat the water and to direct it to the brewing chamber. The brewing chamber includes a tray to hold the package of ground coffee and a pedestal to position a cup therein to receive the brewed coffee.

U.S. Pat. No. 4,875,408 relates to a beverage maker for use in automotive vehicles having a beverage-brewing chamber which has an upper brewing chamber area for receiving heated water from a water heater and a lower brewing chamber area for receiving a disposable brew basket.

U.S. Pat. No. 5,123,335 relates to a coffee maker apparatus arranged for mounting within a transport vehicle to include a housing with a water reservoir operative through an on/off switch to direct the water from within the reservoir to a drinking cup upon directing the water through coffee and a filtering apparatus.

U.S. Pat. No. 5,233,914 relates to an in-car coffee maker which allows the driver of a motor vehicle to brew a cup of coffee or other single portion of brewed beverage without taking attention from the road. The device is stabilized by an anchor base and includes a rotatable holder clamp to level the coffee maker on an uneven floor or other surface of a motor vehicle, and an interlock mechanism prevents commencement of the brewing cycle unless the drinking cup is applied in proper position adjacent to coffee maker.

U.S. Pat. No. 5,274,736 relates to a pressurized heating apparatus for making coffee in an automobile. The maker is adapted to be used in and mounted to an automobile and includes the coffee cup to receive brew which can be secured in tandem with the brewing chamber to prevent spills while driving.

U.S. Pat. No. 5,377,581 relates to an electrical coffee pot positionable in a vehicle and operable from a cigarette lighter receptacle.

U.S. Pat. No. 6,037,570 relates to a portable brewing pot for use in vehicles. The device contains a container having a spout extending upwardly from a lower portion thereof. The spout has an open lower end in communication with the hollow interior of the container. The container has a recess formed therein disposed upwardly of a closed lower end thereof. A heating coil is positioned within the hollow interior of the container and is secured to the closed lower end. The heating coil has a pair of female contacts extending outwardly of the closed lower end. A heating plate is provided having a generally cylindrical configuration. The heating plate has an open upper end, a closed lower end and a cylindrical side wall there between.

U.S. Pat. No. 6,123,010 relates to a rechargeable mobile beverage maker with portable mug and carrying case. Both units have self-contained carrying cases and may be powered by electric, rechargeable battery pack, solar power, a wind up generator, and a cigarette lighter plug.

While the above described patents are directed to portable coffee makers for use in automobiles and the like, they are generally complicated in their construction and have relatively bulky structures substantially approaching the configuration and construction of household coffee making appliances. The present invention is directed to an apparatus for brewing coffee which is relatively compact and essentially utilizes all available space for performing all necessary functions in preparing the brewed coffee. The apparatus is capable of operation with 110 volt alternating current or electrical power provided in a motor vehicle, either directly through the cigarette lighter or accessory adapter socket, or via a power inverter which converts conventional direct current power to household alternating current.

SUMMARY OF THE INVENTION

The invention relates to an apparatus for brewing coffee, which comprises a housing having an inner chamber for receiving and retaining brewed coffee, a water reservoir adjacent to and generally surrounding the inner chamber for receiving water, means for heating the water contained in the water reservoir, a brew valve positioned above the inner chamber for supporting coffee grounds, the brew valve being movable between a first inactive position and a second active position for brewing coffee, and means for directing heated water from the water reservoir to the brew valve and to the coffee grounds. When the brew valve is in an on position, the heating means may be activated to heat the water in the water reservoir, such that heated water flows to the brew valve and to the coffee grounds to produce brewed coffee, and into the inner chamber. The brew valve preferably comprises means to selectively open and close vents to the inner chamber and the water reservoir, and the water reservoir is preferably generally concentric with the inner chamber.

Preferably the brew valve comprises means to activate the water heating means, and the water reservoir includes a conduit for directing heated water to the brew valve. The brew valve is preferably rotatable and includes a coffee filter for supporting coffee grounds thereon. The conduit is adapted to direct heated water to the brew valve and onto the coffee grounds to brew a coffee beverage, the coffee beverage passing through the coffee filter. The brew valve includes a control knob adapted to rotate the valve between respective "brew," "off," and "inactive"- or "neutral" positions. The housing comprises a lower section and an upper section, the upper section being releasably attached to the lower section, and the means for heating water is an electrical heating element which is supplied with electrical power through an electric power cord.

The electric power cord includes one of a 110 volt plug and an adapter for use with a motor vehicle accessory socket. Also, the power cord may be releasably attached to the housing and electrically connected to the water heating element by a removable electrical plug.

The conduit in the water reservoir comprises a riser tube for receiving heated water to be directed to the brew valve, the riser tube being associated with at least one pressure valve which permits entry of heated fluid therein when a predetermined pressure has been reached. Further, a beverage pour spout is provided and is rotatable between closed and open positions.

The beverage pour spout preferably includes a ball valve, but may be of an alternative construction having a pour spout having a spring biased gate for selectively permitting beverage to be poured there from.

The brew valve preferably comprises a spherical member, at least a portion of which is a screen which is removable to provide access to the inner space of the brew valve for adding coffee grounds, cleaning and the like, and the fluid riser tube is associated with at least two of the pressure valves to permit heated water to rise therein. The brew valve includes a rotatable control knob and the means for heating the water contained in the water reservoir comprises a bar and electrical switch movable between on and off positions by the brew valve rotatable control knob, corresponding to brew and non-brew positions.

The invention also relates to an apparatus for brewing coffee, tea or the like which comprises a generally cylindrical housing having an inner chamber concentric therewith for receiving and retaining brewed beverage, a water reservoir adjacent to and generally concentric with the inner chamber, for receiving water, an electrically powered device for heating the water contained in the water reservoir, a rotatable brew valve positioned above the inner chamber for supporting brewing ingredients for brewing the beverage, and a water tube positioned within the water reservoir for directing heated water from the water reservoir to the brew valve and to the brewing ingredients. When the brew valve is rotated to a brewing position, the heating means is activated to heat the water in the water reservoir, such that heated water flows to the brew valve and to the ingredients to produce the brewed beverage, and into the inner chamber.

The apparatus for brewing coffee also comprises a generally cylindrically shaped housing having a lower housing portion and a removable upper housing portion, the lower housing portion having an inner chamber concentric therewith for receiving and retaining brewed coffee, a water reservoir adjacent to and generally concentric with the inner chamber, for receiving water, an electrical coil for heating the water contained in the water reservoir, a brew valve positioned with the upper housing portion and adapted for supporting coffee grounds. The brew valve is rotatable between an upright position for supporting the coffee grounds in position for brewing coffee, and in opposite position for gaining access therein for adding coffee grounds or cleaning, and a water riser tube positioned within the water reservoir for directing heated water from the water reservoir to the brew valve and onto the coffee grounds. A pour spout is capable of being opened and closed for selectively pouring coffee from the inner chamber. When the brew valve is in the upright position, the heating means is activated to heat the water in the water reservoir, such that heated fluid flows to the brew valve and onto the coffee grounds to produce brewed coffee, and into the inner chamber.

The apparatus also comprises an electric power wire removably attached to the lower housing by an electrical plug, for providing electric power to the electrical coil.

BRIEF DESCRIPTION OF THE DRAWINGS

FIG. 6 is a cross-sectional view taken along lines 6-6 of FIG. 2, illustrating the brew valve knob in the "ON" position;

FIG. 7 is a cross-sectional view taken along lines 7-7 of FIG. 2, illustrating the vents in the open condition;

FIG. 8 is an elevational cross-sectional view similar to FIG. 2, showing the apparatus of FIG. 1 in the "OFF" position with the vents closed;

FIG. 9 is a cross-sectional view taken along lines 9-9 of FIG. 8, showing the brew valve knob in the "OFF" position, disconnecting the heating element;

FIG. 10 is a cross-sectional view taken along lines 10-10 of FIG. 8 showing the vents in the closed condition when the brew valve knob is in the position shown in FIG. 9;

FIG. 11 is an elevational cross-sectional view of the upper portion of the apparatus of FIG. 1, showing the brew valve knob and heating element control cam rotated 270 degrees counterclockwise to the "NEUTRAL" position corresponding to the position shown in FIG. 12;

FIG. 12 is a cross-sectional view taken along lines 12-12 of FIG. 11, showing the brew valve knob in the "NEUTRAL" position which permits removal of the upper section without drips;

FIG. 13 is a cross-sectional view taken along lines 13-13 of FIG. 12 showing the closed condition of the vents when the brew valve knob is in the "NEUTRAL" position shown in FIGS. 11 and 12;

FIG. 17 is a cross-sectional view of an alternative embodiment of a pour spout, incorporating a spring biased valve operable by the user's finger to pour the beverage; and FIG. 18 is a cross-sectional view similar to FIG. 17, showing the coffee being poured from the apparatus using the pour spout system of FIG. 17.

DETAILED DESCRIPTION OF THE PREFERRED EMBODIMENTS

In the following description of the present invention, reference is made to an apparatus for brewing coffee. However, it should be understood that the apparatus is also adaptable to brewing alternative beverages such as tea, hot chocolate and the like by utilizing the appropriate brewing ingredients such as tea leaves, cocoa or the like. User's fingers are number "81."

Figure 1:
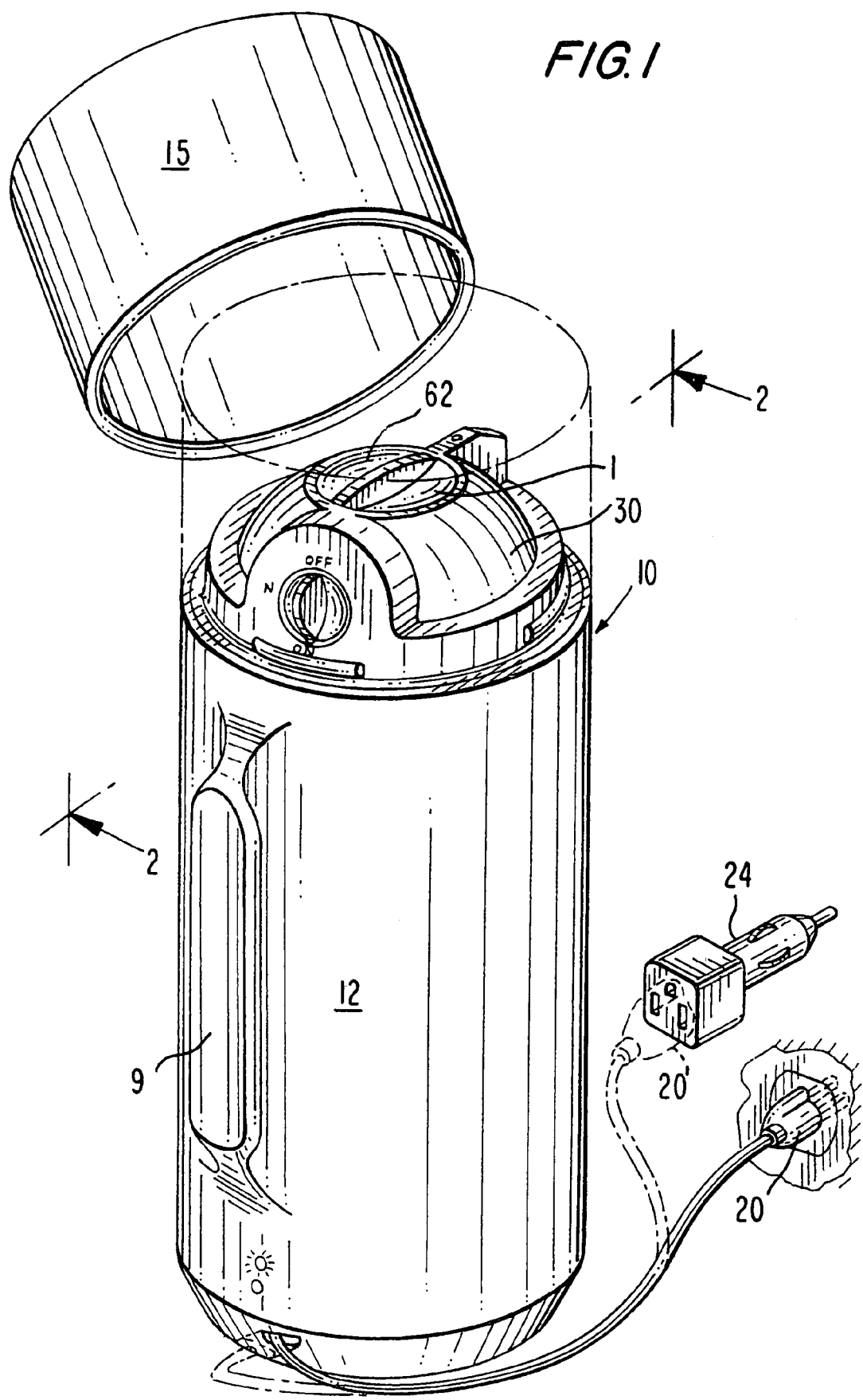
FIG. 1 is a perspective view from above, of an apparatus for brewing coffee according o the present invention.
Figure 2:
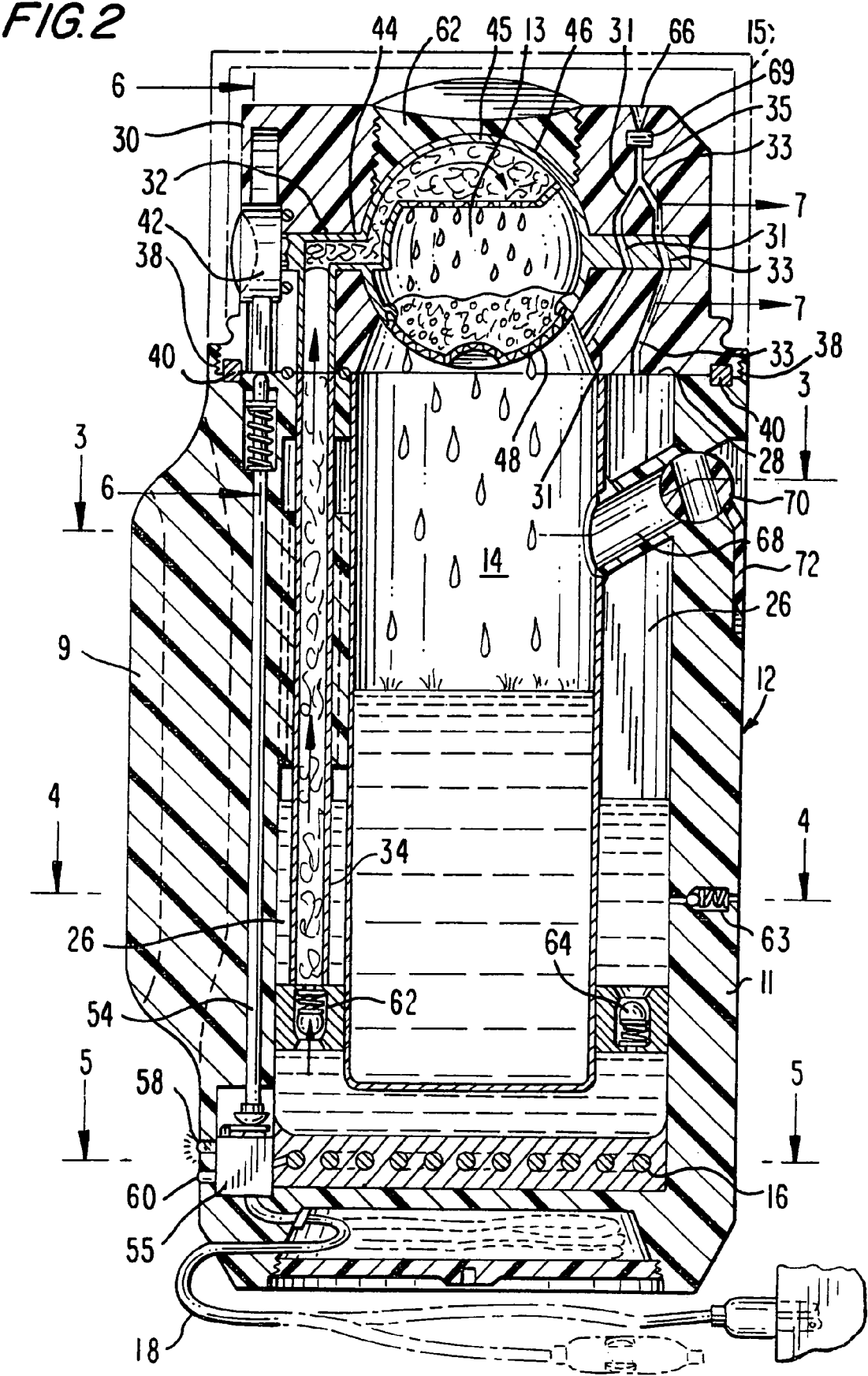
FIG. 2 is a cross-sectional view taken along lines 2-2 of FIG. 1.
Figure 3:
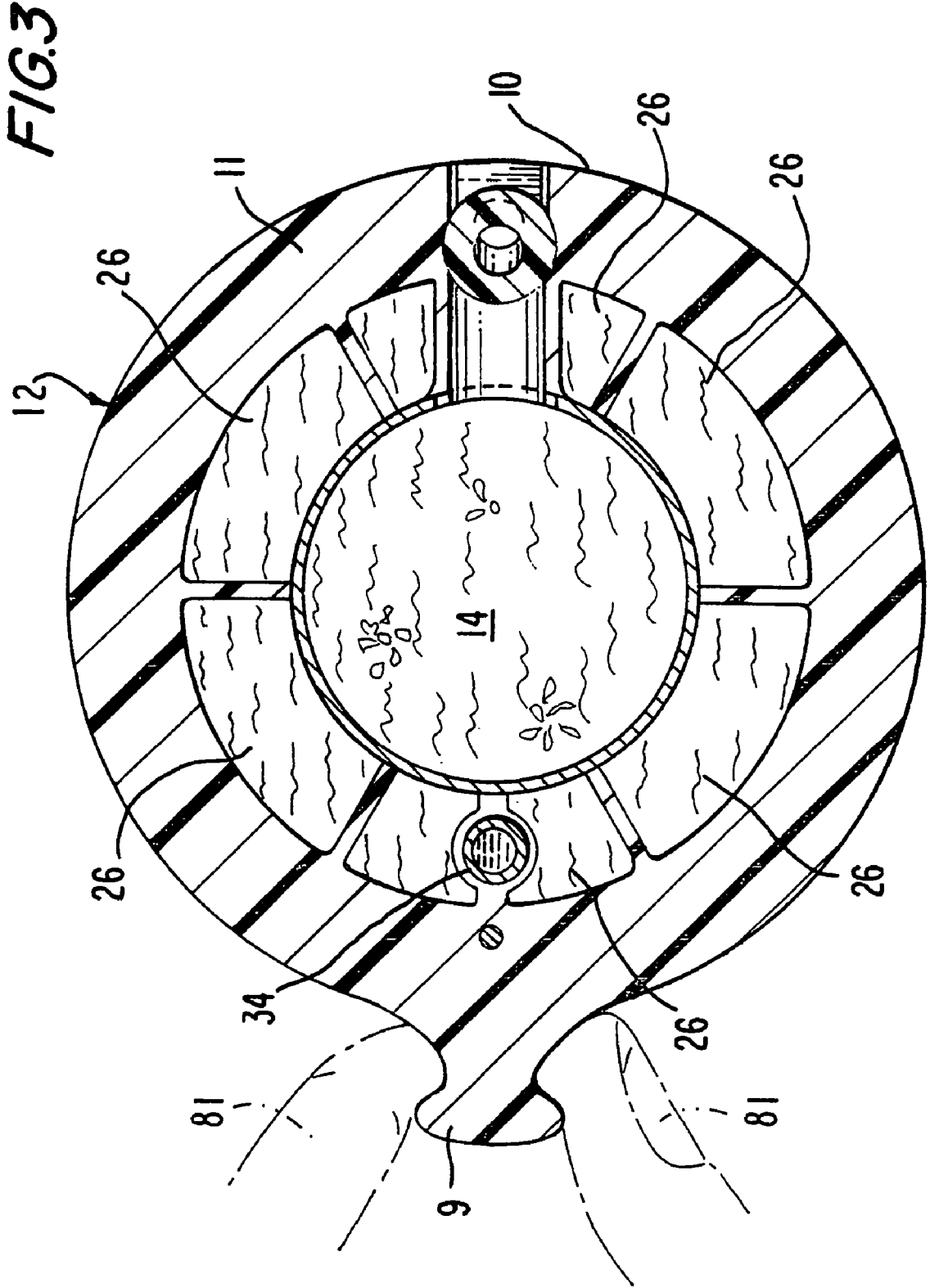
FIG. 3 is a cross-sectional view taken along lines 3-3 of FIG. 2, illustrating the inner section of the apparatus, and the pour spout in the closed condition.
Figure 4:
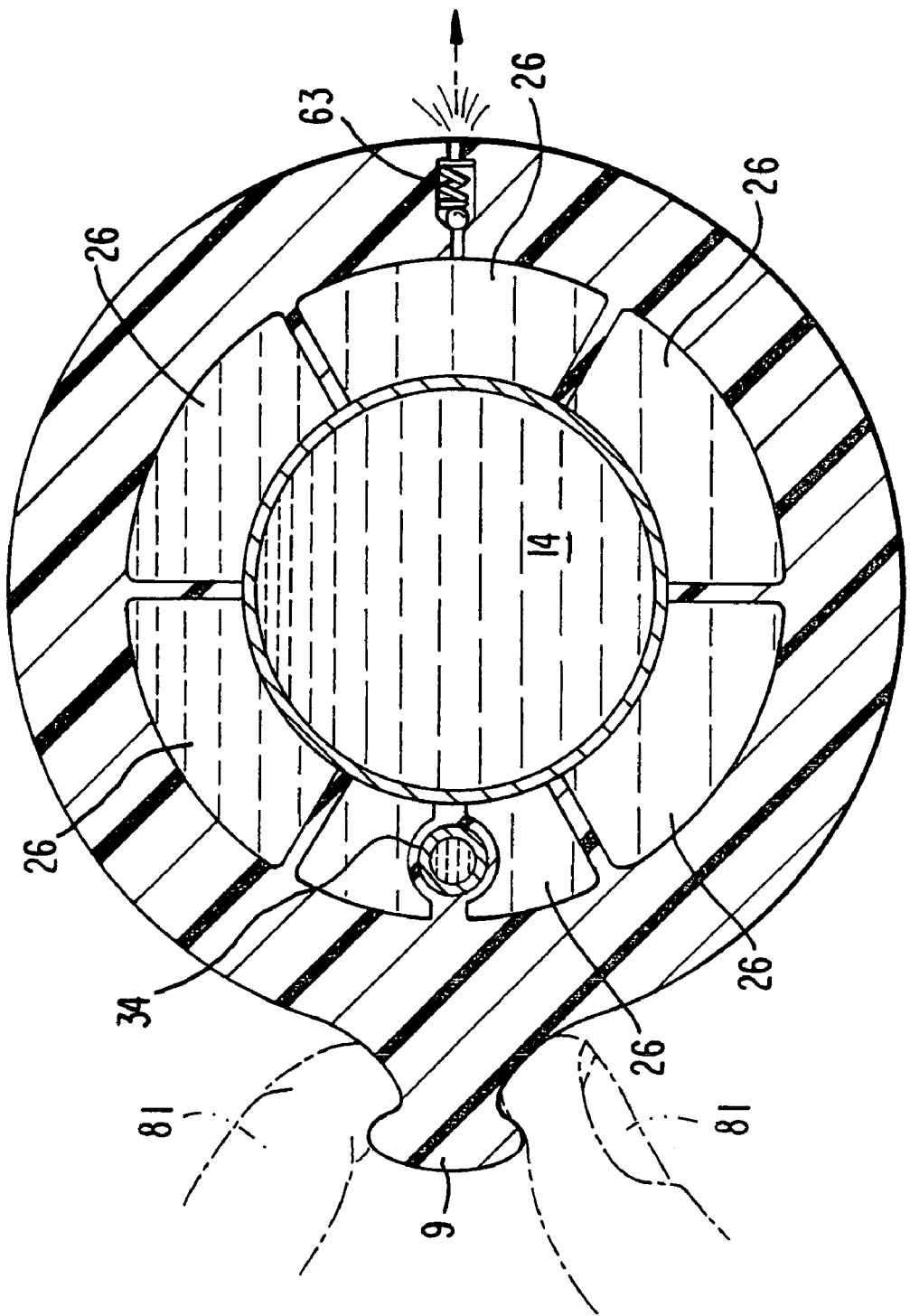
FIG. 4 is a cross-sectional view taken along lines 4-4 of FIG. 2 and showing the high pressure safety release valve.
Figure 5:
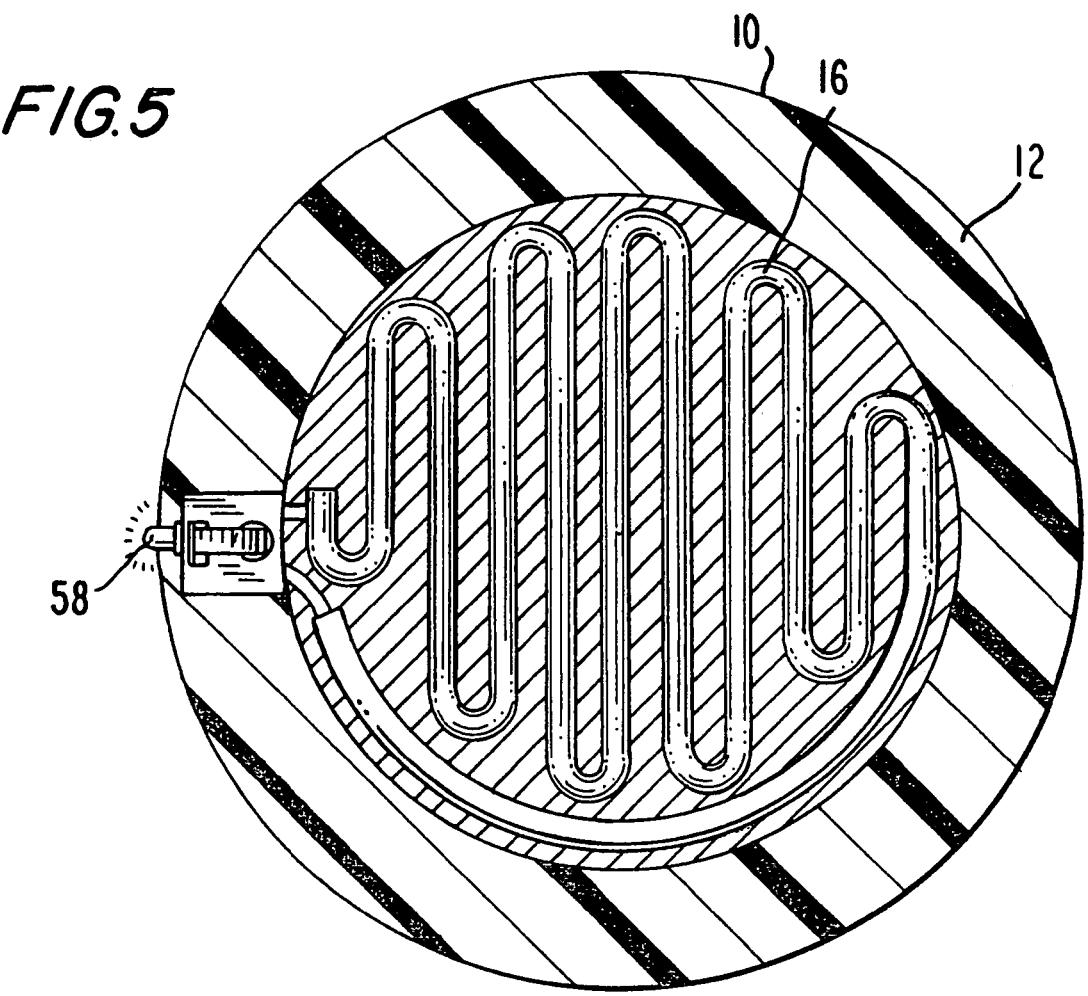
FIG. 5 is a cross-sectional view taken along lines 5-5 of FIG. 2, illustrating the water heating element in plan view.
Figure 16:
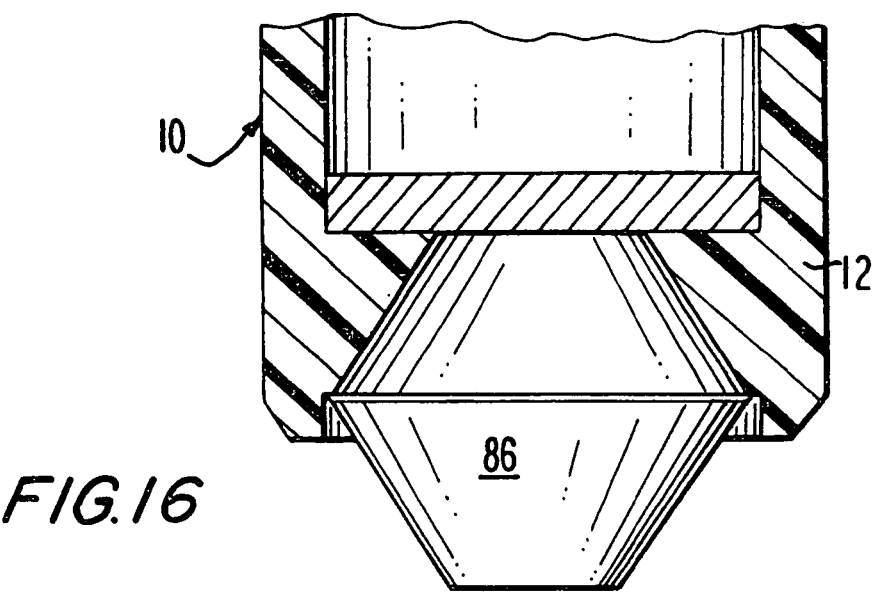
FIG. 16 is a cross-sectional view of the bottom section of the apparatus of FIG. 1, illustrating an optional removable storage container at the lower section, appropriately configured and dimensioned to fit into a cup holder of the type incorporated in motor vehicles.

Referring to the drawings, and in particular to FIGS. 1 and 2, there is shown an apparatus 10 for brewing coffee, in accordance with the present invention. The apparatus 10 includes outer shell 12 having handle 9 and a suitable heat insulating material 11 such as plastic foam materials, including polyurethane, polystyrene or the like. Shell 12 includes inner coffee storage compartment 14 dimensioned and configured to receive the brewed coffee which drips downwardly from the brewing chamber 13 positioned directly there above. Cup or mug 15 is attached by interference lip means or alternatively, by threads, to upper housing section 30.

Referring again to FIG. 2, heating element 16 is located below the coffee storage compartment 14 and is appropriately supplied with electrical power via electrical wire 18, which is capable of being powered by a conventional 110 volt duplex wall outlet via plug 20. Alternatively, wire 18 can be powered through a motor vehicle accessory socket or cigarette lighter socket via alternative plug 22 shown in FIG. 2. In yet another embodiment as shown in FIG. 1, wire 18 can be powered through a motor vehicle accessory socket in an automobile, SUV, RV, Mini-van, boat or the like, or through a cigarette lighter socket utilizing a motor vehicle power inverter 24 shown in FIG. 1. Such power inverters are generally available from motor vehicle retail parts suppliers and transform direct current (DC) to standard type household alternating current (AC) and are available for various power levels. Examples of such power inverters are inverters marketed by Xantrex Technology Inc, of Buraby, Canada, under the trade names Prosine Power Wave Inverters, X Power Inverters and the like. Other such inverters are available from Vector Manufacturing Inc. Any suitable power inverter may be used with the present invention. Furthermore, preferably power wire 18 may be made to be disconnected from the coffee maker by optional removable socket 19 shown in dash lines, in FIG. 1.

Referring to FIGS. 1 and 2, shell 12 includes inner water storage jacket 26 which has sufficient volume to receive cold water suitable for user in brewing the beverage. The cold water is introduced through upper opening 28 after removal of upper section 30 which contains brew valve 32, which will be described in greater detail herein below.

Water storage jacket 26 includes heated water conduit 34 which receives heated water through "one-way" spring biased pressure valves 62, 64 which are made to open when the water in jacket 26 is heated sufficiently to a boiling temperature. When heated, the water enters conduit 34, through spring biased pressure valves 62, 64 and is directed up to brew valve 32 which will now be described.

Referring to FIG. 2, upper housing section 30 is attached to lower housing section 36 of outer shell 12 by high pitch threads 38, and sealed by elastomeric seal 40 so that the system is completely sealed and fluid-tight when brewing the beverage. Brew valve 32 includes rotatable knob 42 attached by connecting tube 44 to spherical chamber 46. The upper section 45 of spherical chamber 46 as shown in FIG. 2 may be made of plastic, metal or the like. The lower section 47 of spherical chamber 46 shown in FIG. 2 is a filter screen 48 which may be of coffee filter porosity to filter the brewed coffee. Alternatively, the filter screen 48 may be provided with larger screen openings and a separate paper coffee filter may be placed thereon and the coffee grounds 50 (i.e. ground coffee) placed on the filter paper as in conventional coffee makers. Still alternatively, the coffee grounds may be introduced into the brew valve 32 by placement of the well-known coffee pods which comprise coffee grounds 50 contained with a pouch made of filter paper.

Referring again to FIG. 2, a screen 52 having larger openings than filter screen 48 is attached and positioned as shown above the coffee grounds 50 for evenly distributing the heated water from conduit 34 during brewing, which may or may not be approaching a gaseous (or steam) phase.

The heated water rises in conduit 34 and thereafter enters brew valve 32 through connecting tube 44, then passes over screen 52, so as to be evenly distributed in the form of droplets onto the coffee grounds 50 to provide a fully brewed beverage. After passage through the coffee grounds 50 and filter screen 48 the final product in the form of brewed coffee is collected and stored in the coffee storage compartment 14.

Referring again to FIGS. 2 and 6, it can be seen that after insertion of the plug 20 into the wall outlet, the heating cycle of the water in jacket 26 can be initiated by turning brew valve knob 42 to clockwise to the position shown in FIG. 6 so as to depress rod 54 against spring 56 to in-turn, depress switch 55 to activate heating element 16. When heating element 16 is activated, the "ON" light 58 becomes illuminated, as shown in FIGS. 1 and 2. When rod 54 is released by rotating knob 42 to the position shown in FIGS. 8 and 9, switch 55 is inactivated and the "ON" light 58 is turned off. Simultaneously, the "OFF" light 60 is turned on. Lights 58 and 60 may be color coded, such as red and green.

Figure 15:
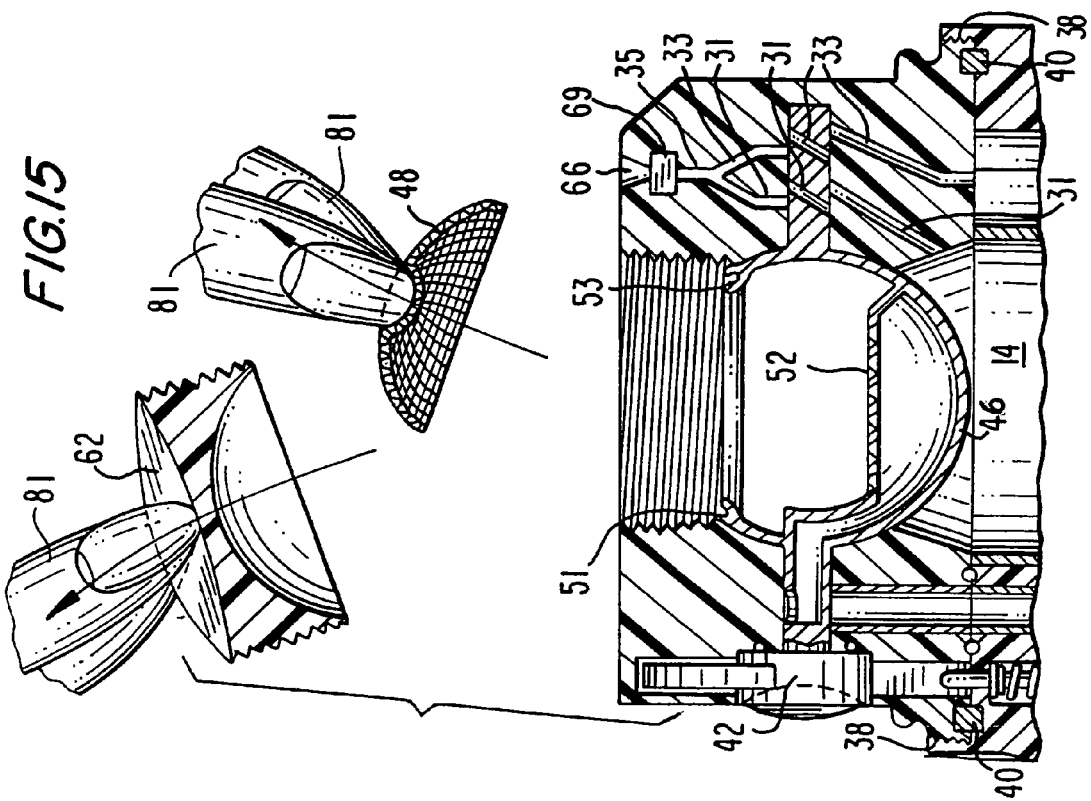
FIG. 15 is a cross-sectional view of the upper portion of the apparatus of FIG. 1, illustrating the conveniently removable threaded crown for gaining access to the removable coffee filter screen for cleaning and/or introducing coffee grounds into the brew valve.

Referring once again to FIG. 2, in conjunction with FIGS. 6, 7, 9 11, 12 and 15, the operation of the brew valve 32 will now be described. In FIGS. 2 and 6, brew valve 32 is shown in the coffee brewing position. Access to the brew chamber 13 is provided by rotating and unscrewing cap 62 as shown in FIG. 15. Once brew valve 32 is rotated 180 degrees by turning brew valve knob 42 as shown in FIGS. 8 and 9, the removable filter screen 48 may be removed for cleaning and placement of coffee grounds 50 (or coffee pod) into the chamber 13 and onto screen 52 as shown in FIG. 15. It can be seen that when brew valve 32 is in the position shown in FIGS. 8 and 15, vents 31, 33 and 35 are not aligned so as to seal the system.

After placement of the coffee grounds 50 onto screen 52 as shown in FIG. 8, filter screen 48 is then placed into position and retained by end clips 51, 53. Brew valve 32 is then rotated 180 degrees clockwise from the position shown in FIGS. 8 and 9 to the position shown in FIGS. 2 and 6. Extension arm 43 of brew valve knob 42 engages and depresses rod 54 which in turn engages switch 55 to activate heating element 16 to heat the water in water storage jacket 26. At the same time vents 31, 33 and 35 become aligned to permit venting of the water storage jacket 26 and the coffee storage compartment 14 for brewing coffee. Once the water is heated to the boiling point (or possibly approaching a steam phase), pressure develops to cause the heated fluid to depress spring biased one-way flow valves 62, 64, thereby permitting the heated fluid to transfer from the water storage jacket 26 and to rise upwardly into conduit 34 and into the brew chamber 13 of brew valve 32, while air is permitted to enter the water storage jacket 26 via the vents 33, and to exit the coffee storage compartment 14 via the vents 31. Ultimately, all of the escaping air exits the system through whistle 69 and then through aperture 66. When the brewing cycle has been completed, the vigorous flow of air and/or steam through aperture 66 will cause whistle 69 to be activated to provide an audible signal of completion of the brewing cycle.

Figure 14:
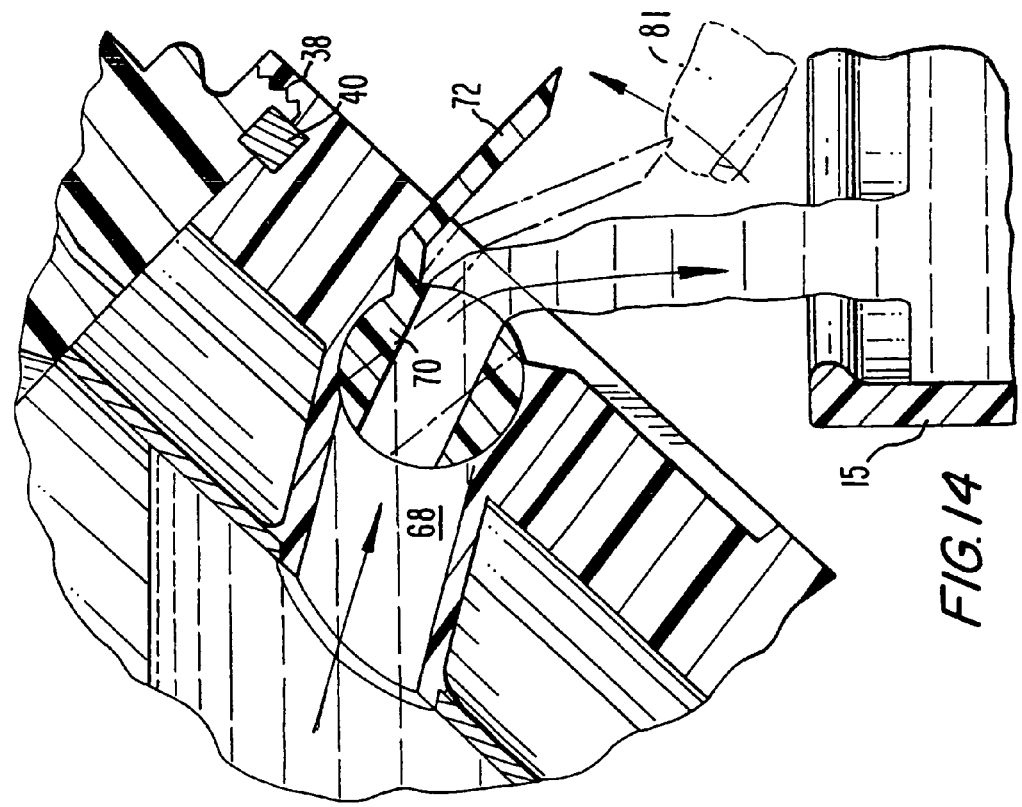
FIG. 14 is a cross-sectional view of the pour section of the apparatus of FIG. 1, illustrating a preferred pour spout valve for pouring the brewed coffee, and the spout valve being selectively rotated to the open position.

After completion of the brewing cycle as described, access to spout 68 is obtained by lifting spout extension arm 72 of rotatable "ball-type" pour valve 70 to the position shown in FIG. 14 to permit pouring the brewed coffee into a mug or container 15 as shown.

Higher pressure safety valve 63 permits release of steam or water in the event fluid flow becomes blocked due to clogging of components in the system.

Referring to FIGS. 2, 6, 11 and 12 there is illustrated the procedure for removal of upper housing section 30 from lower housing section 36. Knob 42 of brew valve 32 is first rotated from the "ON" (or 6 o'clock) position shown in FIG. 6, 270 degrees to the "NEUTRAL" (9 o'clock) position shown in FIG. 12. In this position the brew valve 42 is oriented as seen in FIG. 11, with the filter screen 48 in the 9 o'clock position, as would be viewed with respect to FIG. 12. Thereafter, the upper housing section 30 may be rotated counterclockwise as viewed from above to release high pitch threads 38 thereby permitting removal of the upper housing section 30. Rotation of upper housing section past rod 54 is made possible by the configuration shown in FIG. 12 whereby arcuate camming heal 30a rises above rod 54 due to the fact that threads 38 shown in FIG. 1 are of relatively high pitch. Therefore while camming heal 30a may depress rod 54 slightly, rod 54 is not depressed sufficient to activate switch 55 when the upper housing section 30 is removed. During this movement, vents 31, 33 are misaligned as shown in FIGS. 11 and 13 so as to prevent liquid or air from escaping from the system.

Once upper housing section 30 has been removed, the upper opening 28 of water storage jacket 26 is exposed for introduction of sufficient cold water for initiating the brew. While one cup of water is contemplated, the apparatus can be made larger to receive sufficient water to brew more than one cup of coffee.

Referring to FIGS. 17 and 18 there is illustrated an alternative embodiment 74 of a pour spout which includes release bar 76 biased toward the closed position by spring 78 whereby movable plate 80 blocks the fluid flow through spout 82 as shown. Upon depressing bar 76 downwardly against spring 78, by finger 81 shown in phantom in FIG. 18, plate 80 moves downwardly to align aperture 84 with spout 82 to permit pouring the beverage out of the coffee storage compartment 14. FIG. 17 shows the location for positioning of a user's finger 81, as is shown in phantom in FIG. 18.

FIG. 18 also shows an alternative structure to remove upper housing section 30 by pivoting about pivot pin 86, using an appropriate snap locking device (not shown) on the opposite side to lock the upper housing section 30 to the lower housing section 12.

I claim:

1. Apparatus for brewing coffee, which comprises:
   a) a housing having an inner storage compartment for receiving and retaining brewed coffee;
   b) a water reservoir adjacent to and generally surrounding said inner chamber for receiving water;
   c) a brew valve positioned within said housing and above said inner storage compartment for supporting coffee grounds, said brew valve being movable between a first inactive position for reception of coffee grounds, and a second active brewing position for receiving heated water for brewing coffee and for permitting the brewed coffee to exit said brew valve;
   d) means for heating the water contained in said water reservoir; and
   e) means for directing the heated water from said water reservoir to said brew valve and onto said coffee grounds to brew coffee;
   whereby, when said brew valve is moved to said brewing position, said heating means may be activated to heat the water in said water reservoir, such that heated water flows to said brew valve and onto said coffee grounds to produce brewed coffee, and the coffee is permitted to exit said brew valve and flow into said storage compartment.

2. The apparatus according to claim 1, wherein said brew valve comprises means to selectively open and close vents to said inner storage compartment and said water reservoir.

3. The apparatus according to claim 2, wherein said water reservoir is generally concentric to said inner storage compartment.

4. The apparatus according to claim 3, wherein said brew valve is associated with means to activate said water heating means.

5. The apparatus according to claim 4, wherein said water reservoir includes a conduit for directing heated water to said brew valve.

6. The apparatus according to claim 5, wherein said brew valve is rotatable and includes a coffee filter for supporting coffee grounds thereon during brewing, and said conduit is adapted to direct heated water to said brew valve and onto said coffee grounds to brew a coffee beverage, said coffee beverage passing through said coffee filter.

7. The apparatus according to claim 6, wherein said brew valve includes a control knob adapted to selectively rotate said brew valve between respective "neutral," "off," (i.e., non-brewing) and "on" (i.e., brewing) positions.

8. The apparatus according to claim 7, wherein said housing comprises a lower section and an upper section, said upper section being releasably attachable to said lower section.

9. The apparatus according to claim 8, wherein said means for heating water is an electrical heating element which is supplied with electrical power through an electric power cord.

10. The apparatus according to claim 9, wherein said electric power cord includes one of a 110 volt plug and an adapter for use with a motor vehicle accessory socket.

11. The apparatus according to claim 10, wherein said electric power cord is releasably attachable to said housing and electrically connectible to said water heating element.

12. The apparatus according to claim 11, wherein said conduit in said water reservoir comprises a riser tube for receiving heated water to be directed to said brew valve, said riser tube being associated with at least one pressure activated valve which permits entry of heated fluid therein when a predetermined pressure has been reached.

13. The apparatus according to claim 12, further comprising a beverage pour spout movable between closed and open positions.

14. The apparatus according to claim 13, wherein said beverage pour spout comprises a ball valve, said pour spout being rotatable between said closed and open positions.

15. The apparatus according to claim 12, further comprising a beverage pour spout having a gate which is spring biased toward the closed position for selectively permitting beverage to be poured therefrom.

16. The apparatus according to claim 12, wherein said brew valve comprises a spherical member which includes coffee filter screen which is removable to provide access to the inner space of said brew valve for adding coffee grounds, cleaning and the like, and said fluid riser tube is associated with at least two of said pressure activated valves to permit heated water to rise to said brew valve.

17. The apparatus according to claim 1, wherein said brew valve includes a rotatable control knob and said means for heating the water contained in said water reservoir comprises a bar and electrical switch movable between on and off positions by said brew valve rotatable control knob, corresponding to brewing and non-brewing positions.

18. Apparatus for brewing a beverage, which comprises:
a) a generally cylindrical housing having an inner storage compartment concentric therewith for receiving and retaining brewed beverage;
b) a water reservoir adjacent to and generally concentric with said inner chamber, for receiving water;
c) a rotatable brew valve positioned within said housing and above said inner storage compartment for supporting brewing ingredients for brewing the beverage, said brew valve being rotatable between a first inactive position for reception of brewing ingredients, and a second brewing position for receiving heated water for brewing the beverage, and for permitting the brewed beverage to exit said brew valve;
d) means for heating the water contained in said water reservoir; and
e) a water tube positioned within said water reservoir for directing heated water from said water reservoir to said brew valve and onto said brewing ingredients to brew the beverage,
whereby, when said brew valve is rotated to the brewing position, said heating means is activated to heat the water in said water reservoir, such that heated water flows to said brew valve and onto said brewing ingredients to produce the brewed beverage, and the brewed beverage is permitted to exit said brew valve and flow into said storage compartment.

19. Apparatus for brewing coffee, which comprises:
a) a generally cylindrically shaped housing having a lower housing portion and a removable upper housing portion, said lower housing portion having an inner storage compartment concentric therewith for receiving and retaining brewed coffee;
b) a water reservoir adjacent to and generally concentric with said inner chamber, for receiving water;
c) a spherically shaped brew valve positioned within said upper housing portion and adapted for supporting coffee grounds, said brew valve being rotatable between an upright brewing position for supporting the coffee grounds in position for brewing coffee, and an opposite position for gaining access therein for depositing coffee grounds and for cleaning said brew valve;
d) an electrical coil for heating the water contained in said water reservoir;
e) means to activate said electrical coil for heating the water contained in said water reservoir when said brew valve is rotated to said upright position;
f) a water riser tube positioned within said water reservoir for directing heated water from said water reservoir to said brew valve and onto said coffee grounds; and
g) a pour spout capable of being opened and closed for selectively pouring coffee from said inner storage compartment,
whereby, when said brew valve is rotated to said upright brewing position, said heating means is activated to heat the water in said water reservoir, such that heated fluid flows to said brew valve and onto said coffee grounds to produce brewed coffee, and the brewed coffee is permitted to exit said brew valve and flow into said inner chamber.

20. The apparatus according to claim 19, further comprising an electric power wire removably attachable to said lower housing by an electrical plug, for providing electric power to said electrical coil.

21. A method for brewing coffee in an apparatus having a housing having an inner storage compartment for receiving and retaining brewed coffee, a water reservoir adjacent to and generally surrounding said inner storage compartment for receiving water, means for heating the water contained in said water reservoir, a spherically shaped brew valve positioned above said inner chamber, said brew valve being rotatable between a first inactive position for receiving coffee grounds, and a second active brewing position for activating said water heating means, and for receiving heated water onto the coffee grounds for brewing coffee and for permitting the brewed coffee to exit said brew valve, and a water riser tube for directing heated water from said water reservoir to said brew valve, comprising:
a) pouring water into said water reservoir;
b) rotating said brew valve to said second active brewing position to activate said heating means such that the water heated thereby rises in said riser tube to said brew valve and deposits onto the coffee grounds before exiting said brew valve; and
c) collecting the brewed coffee in said inner chamber.

22. The method for brewing coffee according to claim 21, further comprising pouring the coffee from a pour spout associated with said housing.

23. The method for brewing coffee according to claim 1, further comprising a screen positioned within said brew valve for reception of coffee grounds when said brew valve is in said first inactive position, and for permitting the heated water to pass therethrough while distributing the heated water evenly over the coffee grounds when said brew valve is rotated to said second active brewing position.

24. The apparatus according to claim 18, further comprising a screen positioned within said brew valve for reception of coffee grounds when said brew valve is in said first inactive position, and for permitting the heated water to pass therethrough while distributing the heated water evenly over the coffee grounds when said brew valve is rotated to said second active brewing position.

25. The apparatus according to claim 19, further comprising a screen positioned within said brew valve for reception of coffee grounds when said brew valve is in said first inactive position, and for permitting the heated water to pass therethrough while distributing the heated water evenly over the coffee grounds when said brew valve is rotated to said second active brewing position.

26. Apparatus for brewing coffee, which comprises:
a) a housing having an inner chamber for receiving and retaining brewed coffee;
b) a water reservoir adjacent to and generally surrounding said inner chamber for receiving water;
c) means for heating the water contained in said water reservoir;
d) a brew valve positioned above said inner chamber for supporting coffee grounds, said brew valve comprising a spherical member which includes a coffee filter screen which is removable to provide access to the inner space of said brew valve for adding coffee grounds, cleaning and the like, said brew valve being movable between a first inactive position and a second active position for brewing coffee;

e) a fluid riser tube associated with said water reservoir for receiving heated water to be directed to said brew valve, said riser tube being associated with at least one pressure activated valve to permit heated water to rise to said brew valve; and f) means for directing heated water from said water reservoir to said brew valve and to said coffee grounds, whereby, when said brew valve is in said active position, said heating means may be activated to heat the water in said water reservoir, such that heated water flows to said brew valve and to said coffee grounds to produce brewed coffee, and into said inner chamber.

* * * * *